(No Model.)
A. AUBERT.
STOP WATCH.
No. 296,663. Patented Apr. 8, 1884.
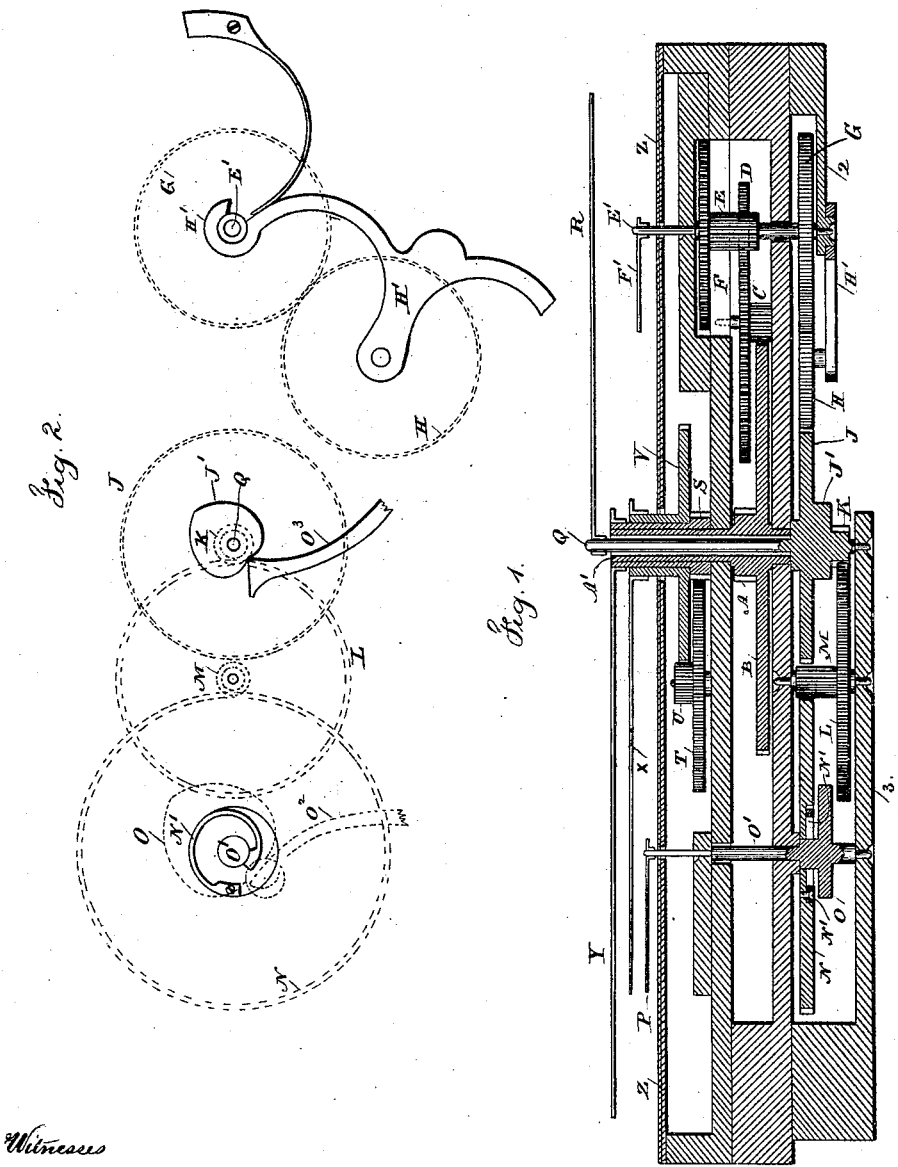
Witnesses
Chas H. Smith
J. Staily
Inventor
Adrien Aubert
per Lemuel W. Serrell
atty

UNITED STATES PATENT OFFICE.

ADRIEN AUBERT, OF SENTIER, SWITZERLAND.

STOP-WATCH.

SPECIFICATION forming part of Letters Patent No. 296,663, dated April 8, 1884.

Application filed August 20, 1883. (No model.)

*To all whom it may concern:*

Be it known that I, ADRIEN AUBERT, a citizen of the Republic of Switzerland, residing at Sentier, Canton of Vaud, Switzerland, have invented an Improvement in Stop-Watches, of which the following is a specification.

My invention relates to means for actuating the independent minute-hand of the stop-watch, as hereinafter described.

In the drawings, Figure 1 is a section of my improved stop-watch, and Fig. 2 is a diagram of the gearing, heart-cams, and levers. It also shows the friction device for connecting the loose wheel upon the arbor of the independent minute-hand with said arbor. These parts are represented of a magnified size.

A is a pinion which gears with teeth upon the spring-barrel of the watch. This spring-barrel is not shown in the drawings, but it is of usual character. The pinion A is upon a tubular arbor, A', carrying the center wheel, B, that meshes with a pinion, C, upon the arbor of the wheel D, and this latter gears with a pinion, E, on the arbor E', that carries the second-hand F'.

F is a wheel that gears with the pinion of the escapement-wheel.

S is the cannon-pinion upon a sleeve surrounding the tubular arbor A', and this sleeve carries the minute-hand Y.

T is a wheel meshing with the pinion S, and U is a pinion on T, that gears with the cannon-wheel V, that carries the hour-hand X.

The parts thus far described are of usual character.

G is a wheel upon the arbor E' of the second-hand, and H is a wheel meshing with G, and carried by a stud on the lever H'. This lever H' is pivoted to a bearing upon the bridge 2, and this bearing is central with the arbor E'; hence said lever has the shaft E' as its center of motion, and the wheels G and H are always in gear.

The arbor Q of the independent second-hand R is supported in the bridge 3, and said arbor is fitted to revolve freely within the tubular arbor A'. The pinion K, wheel J, and heart-cam J' are firmly secured to said arbor Q, and the pinion K meshes with a wheel, L, upon a stud, that carries also the pinion M, which latter gears with a wheel, N, that is loose upon the arbor O' of the independent minute-hand P. There is a recess in one face of the wheel N for a spring, N', and one end of this spring N' is secured to said wheel N, and the free end presses against the hub of the heart-cam O, that is firmly secured to the arbor O'. This spring gives the necessary friction to cause the heart-cam O, shaft O', and hand P to revolve when the wheel N is set in motion; but it allows the arbor O' to be turned independent of the wheel N when the lever O² presses against the heart-cam to bring the hand P back to XII. When the lever H' is moved and the wheel H brought in gear with the wheel J, and the levers O² O³ moved to release the heart-cams J' O, motion is communicated by the gearing G, H, J, K, L, M, and N to the arbors Q and O', and for each complete revolution of the arbor Q and independent second-hand R the arbor O' is turned and moves the independent minute-hand P one space (indicating one minute) upon a small dial on the face Z. The hands P and R are brought back to XII by the levers O² O³ acting upon their respective heart-cams, the lever H' being moved at the same time as the levers O² O³, so as to disconnect the wheels H and J. These levers O² O³ H' are moved by a cam and push-pin, as usual in stop-watches.

It will be apparent that the arbor O', instead of being at one side of the watch, as shown, might be tubular and surround the arbor Q, the same arrangement of gearing K, L, M, and N being used for transmitting motion from the arbor Q to the tubular arbor.

I claim as my invention—

The combination, in a stop-watch, of the arbor Q, independent second-hand R, and heart-cam J', with the arbor O', independent minute-hand P, heart-cam O, wheel N, pinions K M and wheels J L, a frictional connection between the shaft O' and wheel N, and the levers O² O³, substantially as and for the purposes specified.

Signed by me this 14th day of July, A. D. 1883.

ADRIEN AUBERT.

Witnesses:
 G. HEDEGER,
 ERNEST AUBERT.